United States Patent
Wako

(10) Patent No.: US 6,687,605 B1
(45) Date of Patent: Feb. 3, 2004

(54) DESTINATION SPECIFYING METHOD AND SYSTEM

(75) Inventor: Hikaru Wako, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/522,131

(22) Filed: Mar. 9, 2000

(51) Int. Cl.$^7$ .......................... G01C 21/00; G06F 17/30
(52) U.S. Cl. .................. 701/201; 701/210; 340/995.16; 340/995.23
(58) Field of Search ................................. 701/201, 207, 701/208, 210; 709/10, 100; 704/218; 455/456, 455; 340/995.1, 995.16, 995.23

(56) References Cited

U.S. PATENT DOCUMENTS

| | | | |
|---|---|---|---|
| 5,371,781 A | * 12/1994 | Ardon | 455/445 |
| 5,471,392 A | * 11/1995 | Yamashita | 701/200 |
| 5,765,123 A | * 6/1998 | Nimura et al. | 701/208 |
| 5,941,930 A | 8/1999 | Morimoto et al. | 701/201 |
| 6,041,281 A | * 3/2000 | Nimura et al. | 701/211 |
| 6,115,669 A | * 9/2000 | Watanabe et al. | 701/209 |
| 6,292,909 B1 | * 9/2001 | Hare | 714/40 |

FOREIGN PATENT DOCUMENTS

EP 0810571 * 12/1997 ......... G08G/1/0969

* cited by examiner

Primary Examiner—Tan Q. Nguyen
(74) Attorney, Agent, or Firm—Brinks Hofer Gilson & Lione

(57) ABSTRACT

The destination specifying method comprises: (1) configuring a database by associating a telephone number with a name, address, and position of a facility, and when a plurality of facilities share one telephone number, configuring a database by associating the one telephone number with a plurality of the facility names, (2) displaying a telephone number list on a display screen, when a destination is set by a telephone number, and (3) when a specific telephone number is selected from the list, if the telephone number is associated with a plurality of facilities, displaying a facility name list of a plurality of the facilities, and when a facility is selected from the facility name list, displaying detailed information regarding the selected facility. A system for carrying out this method is also described.

20 Claims, 6 Drawing Sheets

FIG. 2

| TEL. NO. | FLAG INDICATING ASSOCIATION WITH PLURAL FACILITIES | NAME OF FACILITIES | ADDRESS OF FACILITIES | POSITION (LONGITUDE & LATITUDE) | CATEGORY |
|---|---|---|---|---|---|
| (310)542-8525 | 0 | DEL AMO FASHION CENTER | 3525 W CARSON ST TORRANCE, CA | ---, --- | |
| (800)428-2566 | 1 | AVALON SCENIC TOURS | 1150 QUEENS HWY, LONG BEACH, CA | ---, --- | |
| | | CASINO TOURS | ditto | -- | |
| | | CATALINA CRUISE TO SEAL ROCKS | ditto | -- | |
| | | FLYING FISHBOAT TRIP | ditto | -- | |
| | | GRASS-BOTTOM BOAT TRIP | ditto | -- | |
| | | --- | --- | | |

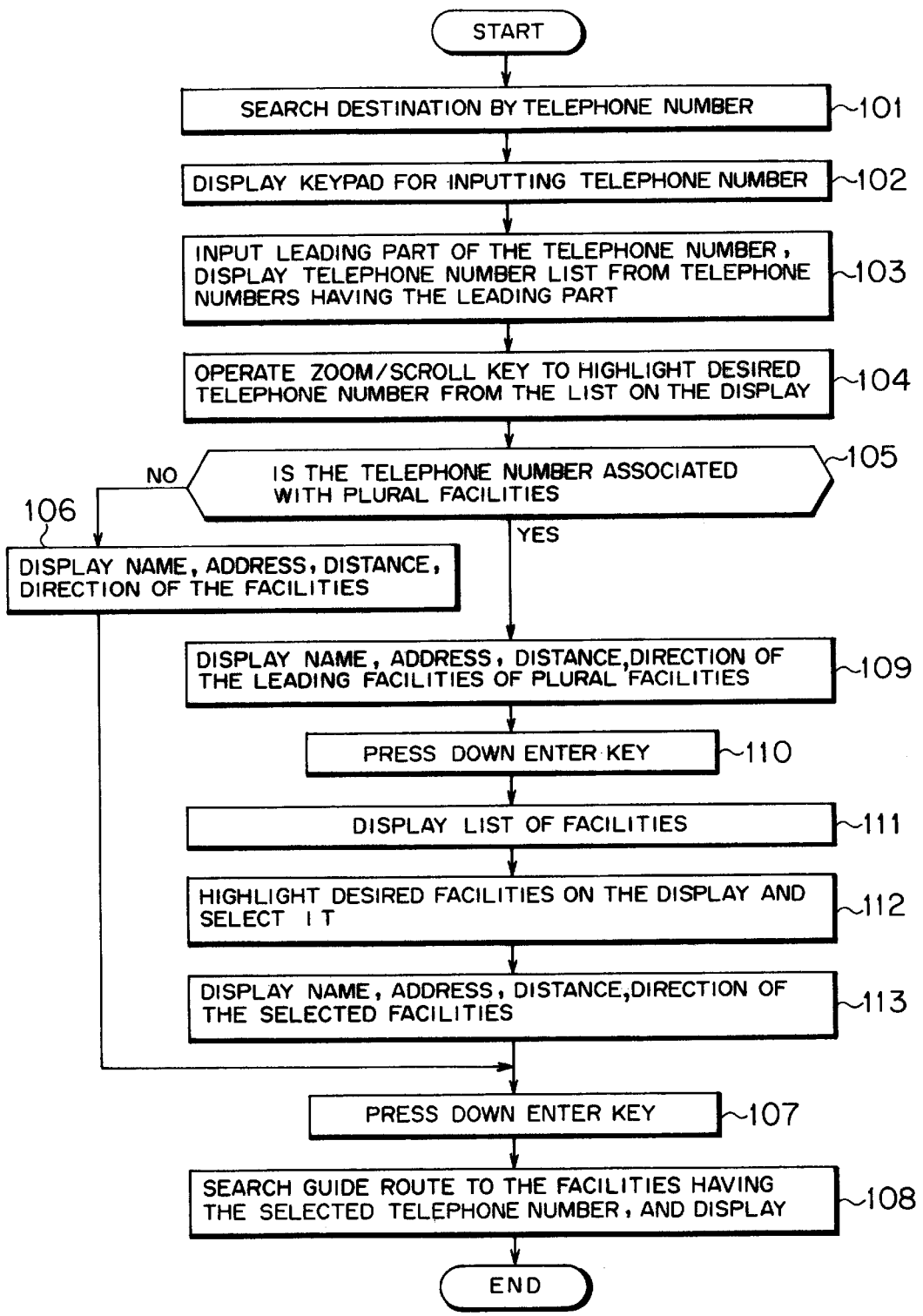

FIG. 5(a)

| Dest | Find Destination by |
|---|---|
| | Address |
| | Intersection |
| | Point of Interest |
| | Map Cursor |
| | Recent Route |
| | Address Book |
| | Phone Number |

FIG. 5(b)

| Dest | Input Place Phone Number | | |
|---|---|---|---|
| ( 3 1 0 ) 3 2 6 – 8 0 0 | | | |
| 1 | 2 | 3 | |
| 4 | 5 | 6 | |
| 7 | 8 | 9 | |
| Delete | 0 | | |
| IPT → 📄 (310) 326-8000 | | | |
| (310) 326-8001 | | | |
| (310) 326-8002 | | | ↓ |

FIG. 5(c)

| Dest | Select Phone Number |
|---|---|
| UNIVERSAL STUDIOS HOLLYWOOD 100 UNIVERSAL CITY PL UNIVERSAL CITY, CA | ● 19.4 mi |
| (818) 622-3474 | ↑ |
| (818) 622-3481 | |
| (818) 622-3801 | |
| (818) 622-4455 | |
| (818) 622-5464 | ↓ |

FIG. 6(a)
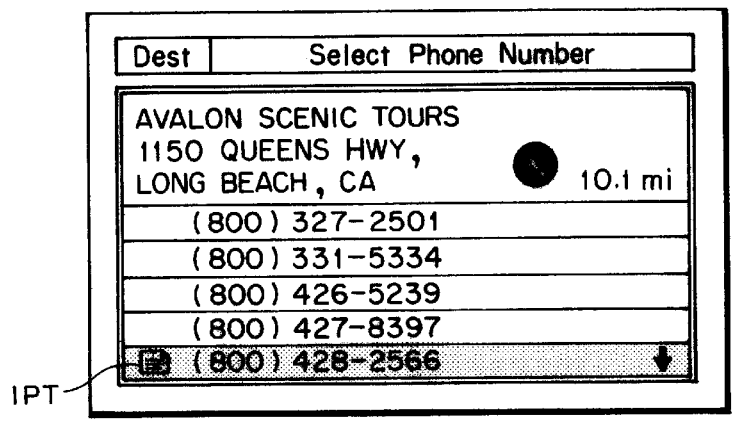
IPT
Press ENTER
FIG. 6(b)
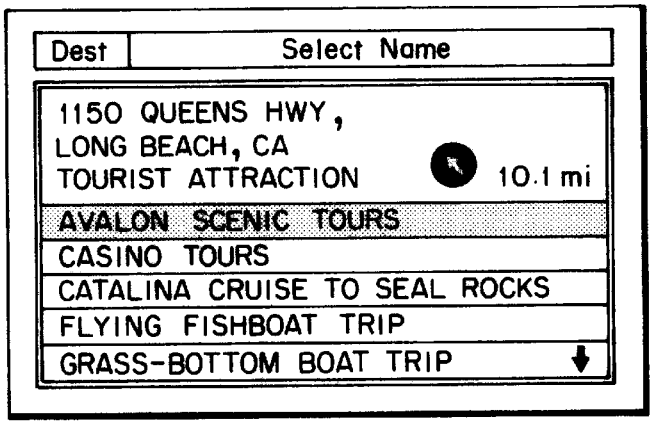

DESTINATION SPECIFYING METHOD AND SYSTEM

BACKGROUND OF THE INVENTION

The present invention relates generally to a destination specifying method for a vehicle navigation system, and more specifically to a destination specifying method for a navigation system that sets a destination by inputting a telephone number.

A vehicle navigation system providing travel guidance to a driver of a vehicle, whereby the driver can easily reach the desired destination, detects the position of the vehicle and reads map data for the area surrounding the vehicle position from a map storage medium, such as a CD-ROM, DVD, etc. In a MAP GUIDE MODE, the navigation system draws the map on a display screen and superimposes a vehicle position mark on a specific place on the map. As the vehicle's present position varies according to the movement of the vehicle, the system moves the vehicle position mark along the guide route, or scrolls the map with the vehicle position mark fixed at a specific position, so that the driver can see a detailed map around the vehicle position with a single glance. In an ARROW GUIDE MODE, the guide route and the roads intersecting the guide route, etc., are displayed in a simplified manner, and the traveling direction at an intersection is displayed with an arrow. Also, the distance to the intersection, direction to the destination, distance to the destination, etc., are displayed, and the traveling direction at the intersection may be guided with a voice output.

In order to receive route guidance in the MAP GUIDE MODE or ARROW GUIDE MODE, the driver inputs the destination so that the system can search a guide route to the destination. The following are methods a driver may use to input a destination:

(1) directly input the address of a destination, (2) in case of the destination being an intersection, specify two streets and input the intersection, (3) directly input the Place Name of a POI (Point of Interest) as being a destination or the telephone number; or input the Place Type of a POI and display a candidate list for the Place Name and select the desired Place Name as the destination from the candidate list, (4) display the latest "n" destinations, and select the present destination from among them, (5) select a destination from locations registered beforehand in the address book, and (6) specify a destination directly on the map using the cursor.

In order to input a POI as a destination by a telephone number, the user performs the following steps: (1) designating that the destination is being set by the telephone number, (2) inputting the leading few digits of the telephone number, (3) after inputting the leading few digits and the system displays a scrollable list of telephone numbers having the same leading digits selecting a desired telephone number from this list, or inputting all of the digits of the telephone number, (4) after inputting the telephone number and the system displays the detailed information (name, address, direction from the present position, distance, etc.) of the POI having the telephone number on the upper part of the screen, confirming that the selection is correct. Thus, the user completes the inputting of the destination.

However, one telephone number can be shared by a plurality of facilities in the same building, or by a plurality of facilities (restaurants, shops, etc.) in a shopping mall. In case of a free dial 1-800 number, sometimes one telephone number can be shared by as many as ninety facilities. Further, one telephone number can be shared by a plurality of facilities having different addresses. For example, when a plurality of doctors have offices in different places in a hospital complex that has one representative telephone number, the operator receives a telephone call placed to the representative telephone number of the hospital and puts the call through to the office of the doctor to receive the call by the extension line.

When a plurality of facilities share one telephone number and the user inputs the telephone number to search the destination, the conventional system only displays the representative name (for example, name of the shopping mall, name of the hospital, etc.) on the screen. Thus, the user cannot get a clear idea as to what kind of facilities and/or shops are available in the shopping mall or building, or whether the facilities and/or shops that the user desires are available. Accordingly, the user may be disappointed to find that the desired facilities and/or shops are not available, when the user sets and actually visits the destination. Further, in case of a hospital, when the user sets the destination and actually visits the hospital, the kind of doctor, which department, and which office location may not be obvious, and sometimes it happens that the doctor in charge has an office at a different location. Thus, as mentioned above, the conventional navigation system has the problem that the system cannot provide sufficient information to the user in searching a destination by a telephone number when one telephone number is shared by a plurality of facilities.

BRIEF SUMMARY OF THE INVENTION

Accordingly, it is an object of the present invention to provide sufficient information to a user in the setting of a destination by a telephone number.

The method of specifying a destination by a telephone number of the invention comprises: (1) configuring a database that associates a telephone number with a name, address, and location of a facility, and when a plurality of facilities share one telephone number, configuring a database that associates the one telephone number with a plurality of the facility names, (2) displaying a telephone number list on a display screen, when a destination is set by a telephone number, (3) when a specific telephone number is selected from the list, or when a telephone number is directly inputted, if the telephone number is associated with a plurality of facilities, displaying a facility name list of a plurality of the facilities, (4) and when a facility is selected from the facility name list, displaying detailed information about the selected facility. With this method of the invention, the user will be able to determine a destination by referring to the facility name list or the detailed information about the facilities.

Further, according to the invention, in the telephone number list displayed on the display screen, a specific icon is displayed near a telephone number associated with a plurality of facilities to distinguish it from other telephone numbers. This will enable a user to easily recognize whether the telephone number is associated with a plurality of facilities or not.

Thus, according to the invention, the names of facilities that share a telephone number and detailed information about the facilities are displayed on the screen, and the user receives sufficient information.

Other features and advantages of the present invention will be apparent from the following description taken in conjunction with the accompanying drawings.

BRIEF DESCRIPTION OF THE DRAWINGS

FIG. 2 is a chart to explain a telephone number database;

FIG. 4 is a flow chart to explain the process of inputting a destination by a telephone number;

FIG. 5 is a display example for inputting a destination by a telephone number; and FIG. 6 is another display example for inputting a destination by a telephone number.

DETAILED DESCRIPTION OF THE INVENTION

Figure 1:
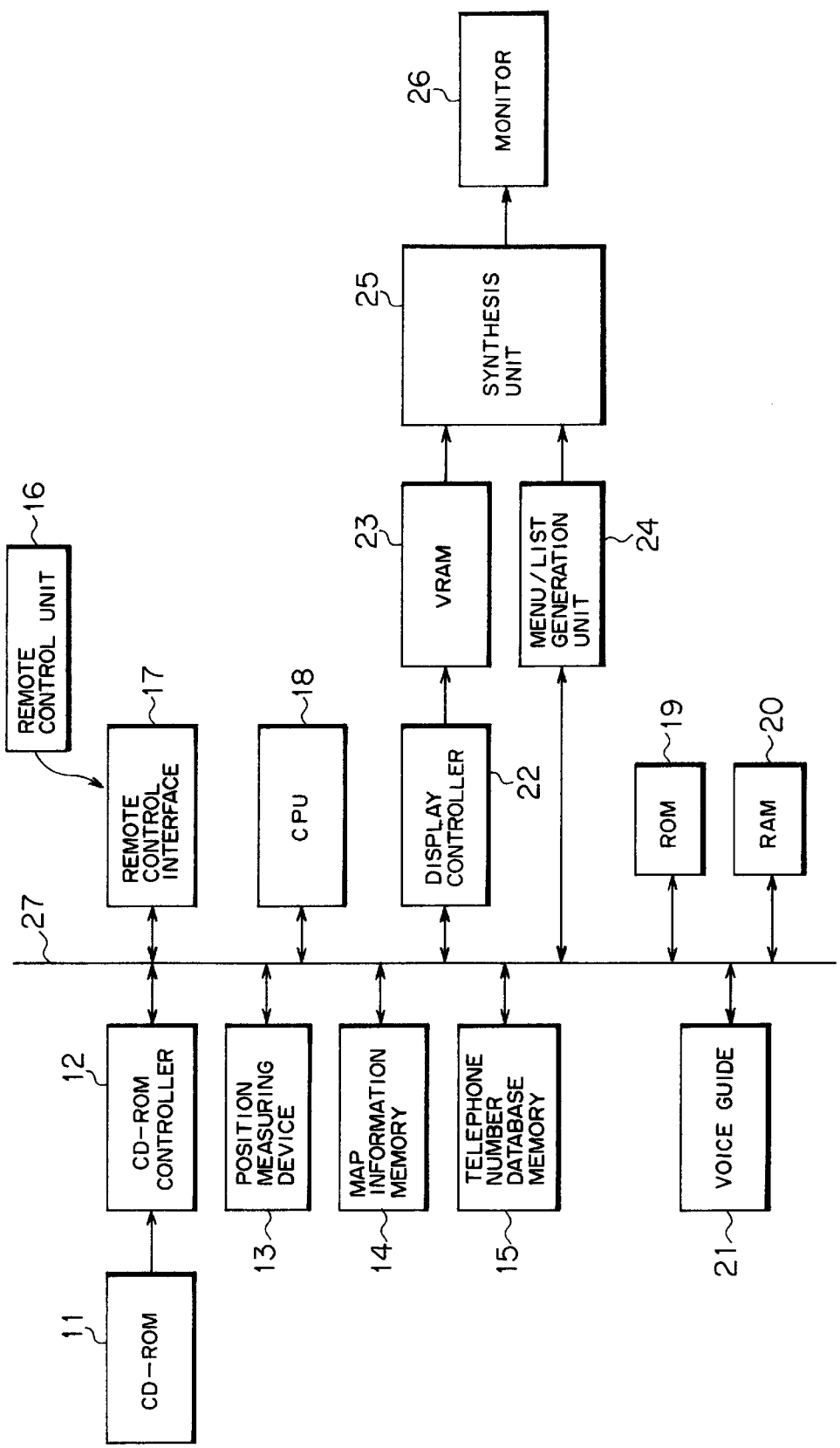
FIG. 1 is a block diagram to illustrate a navigation system according to the present invention.

FIG. 1 is a block diagram to illustrate a navigation system of this invention, in which 11 signifies a map storage medium that contains map information, for example, a CD-ROM, 12 a CD-ROM controller that controls the reading of map information from the CD-ROM, 13 a position measuring device that measures a present vehicle position, and includes a speed sensor to detect a travel distance, a gyro to detect a travel orientation, a CPU position calculation, a GPS receiver, etc. Further, 14 signifies a map information memory to store map information read from the CD-ROM, 15 a database memory to store telephone number database information read from the CD-ROM. As shown in FIG. 2, the telephone number database information is configured to associate a telephone number with the following information:

(1) a flag to indicate whether or not a plurality of facilities are associated with the telephone number, (2) name of the facility, (3) address of the facility, (4) longitude and latitude of the facility, (5) category of the facility (hotel, sporting facilities, restaurant, air terminal, shopping mall, hospital, etc.), and (6) detailed information of (2) through (5) for each facility, when a plurality of the facilities share the same telephone number.

Figure 3:
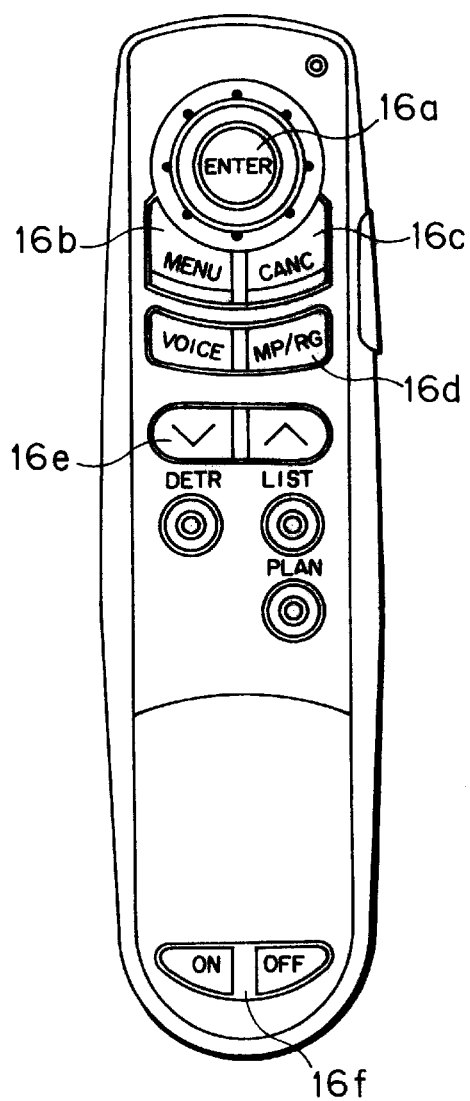
FIG. 3 is an illustration to explain a remote control unit of this system.

Referring back to FIG. 1, 16 denotes a remote control unit that performs the operations of menu selection, expansion/contraction, destination input, etc., 17 a remote control interface. The remote control unit 16 comprises, as shown in FIG. 3, a joy stick/enter key 16a, menu key 16b, cancel key 16c, MP/RG key 16d, zoom/scroll key 16e, monitor on/off key 16f, etc. The joy stick/enter key 16a has a function as the joy stick key that moves the cursor and vehicle mark, etc., in eight directions relativelto the map, or moves the menu bar (highlight position) when selecting a desired menu, and a function as the enter key that sets a focusing position, or selects a menu. The menu key 16b is operated to display the main menu, the cancel key 16c is operated to cancel the current display or to recover the previous display of the menu. The MP/RG key 16d is operated to switch MAP GUIDE MODE and ARROW GUIDE MODE, and the zoom/scroll key 16e is operated to perform expansion/reduction of a map, and up/down shifting or scrolling of a highlight position in various lists.

To return to FIG. 1, 18 denotes a processor (CPU) that controls the entire navigation system, 19 a ROM that stores various control programs, 20 a RAM that stores guide routes and processed results, etc., 21 a voice guide unit that guides the travel direction at a point of intersection with audible voice instructions, 22 a display controller that generates a MAP GUIDE image or ARROW GUIDE image based on the map information, 23 a VRAM that stores the images generated by the display controller, 24 a menu/list generation unit that generates menu images/list images, 25 a synthesis unit, 26 a monitor display, and 27 a bus line.

FIG. 4 illustrates a processing flow of selecting a destination by a telephone number, and FIG. 5 and FIG. 6 illustrate display examples of selecting destination inputs by telephone numbers.

When a user operates the menu key 16b, the navigation system (CPU 18) displays the main menu on the screen of the monitor 26. If the user selects "BEST" from the main menu, the navigation system will display, as shown in FIG. 5(a), the display "Find Destination by" for specifying a method of inputting the destination. Next, the user selects "Point of Interest" to search the destination by the telephone number, and then selects "Place Phone Number" (step 101).

Through the foregoing operations, the navigation system displays the key pad for inputting the telephone number on the upper part of the screen (step 102), as shown in FIG. 5(b). And, when the user inputs, using the key pad, the leading few digits of the telephone number of the facilities as the destination, the navigation system retrieves the telephone number database and displays a list of the telephone numbers having the same leading few digits under the key pad. Also, the navigation system displays the icon IPT before the telephone number with which a plurality of facilities are associated (step 103).

Next, if the user operates the zoom/scroll key 16e and selects the telephone number of a desired facility from the list, the telephone number will be highlighted on the list (step 104). Also, the user can directly input the telephone number by using the key pad without using the list.

Referring to the telephone number database information, the navigation system judges whether the telephone number selected by the user is associated with a plurality of facilities (step 105). If the number is not associated with a plurality of the facilities, the system seeks detailed information about the facility having the telephone number (for example, (818)622-3801) by the telephone number database, and displays the facility name (UNIVERSAL STUDIOS HOLLYWOOD) and the facility address (100 UNIVERSAL CITY PL UNIVERSAL CITY, Calif.). Also, the system calculates the distance and the direction to the facility from the position (longitude and latitude) of the facility and the present position of the vehicle, and displays them by the distance figure (19.4 miles) and an arrow, as shown in FIG. 5(c) (step 106).

To set the displayed facility as the destination, the user performs a decisive operation (OK input). For example, the user presses the joy stick/enter key 16a down (step 107). By this decisive operation, the navigation system searches a guide route to the set destination from the present position of the vehicle, stores the searched guide route in the RAM 20, and thereafter displays the route guidance according to the MAP GUIDE MODE or the ARROW GUIDE MODE (step 108).

At step 105, if the telephone number (for example, (800)428-2566) is associated with a plurality of the facilities, the navigation system displays the leading name of the facilities (AVALON SCENIC TOURS) and the address of the facilities (1150 QUEENS HWY, LONG BEACH, Calif.) on the upper part of the screen, as shown in FIG. 6(a). Also, the system calculates the distance and the direction to the facilities from the position (longitude and latitude) of the facilities and the present position of the own vehicle, and displays them by the distance figure (10.1 miles) and an arrow (step 109).

Since the icon IPT is added to the telephone number ((800)428-2566), the user is able to recognize that the telephone number is associated with a plurality of facilities. If the user then presses the joy stick/enter key 16a down (step 110), the navigation system displays a facility name list instead of the telephone number list on the lower part of the screen, as shown in FIG. 6(b).

Also, the system deletes the facility name from the upper part of the screen, and displays the category (e.g. tourist attraction) of the leading facilities (step 111). Next, when the user highlights a desired facility name on the display, by operating the zoom/scroll key 16e, and selects it (step 112), the navigation system displays the detailed information (name, address, category, distance, direction) of the selected facility on the upper part of the screen (step 113).

To set the displayed facility as the destination, the user performs a decisive operation (OK input). For example, the user presses the joy stick/enter key 16a down (step 107). By this decisive operation, the navigation system searches the guide route to the set destination from the present position of the vehicle, stores the searched guide route in the RAM 20, and thereafter displays the route guidance according to the MAP GUIDE MODE or the ARROW GUIDE MODE (step 108).

According to the invention thus described, the user is able to receive sufficient information when setting a destination by a telephone number, since the navigation system can provide appropriately on the display a name list of a plurality of facilities that share the telephone number, and detailed information regarding the facilities.

Further, according to the invention, since the system displays, on the telephone number list, a specific icon near a telephone number associated with a plurality of facilities in order to distinguish it from other telephone numbers, the user is able to easily recognize whether or not the telephone number is associated with plural facilities.

As many different embodiments of the present invention can be made without departing from the spirit and scope thereof, it is to be understood that the invention is not limited to specific embodiments thereof except as defined in the appended claims.

What is claimed is:

1. A navigation system comprising:
   input means to input a telephone number,
   storage means to store a name, address, and coordinates of a facility corresponding to the telephone number,
   name data judging means to judge whether or not the telephone number inputted by the input means corresponds to a plurality of facilities, and
   display means to display recognition information on the telephone number corresponding to a plurality of facilities, when the name data judging means judges that the telephone number corresponds to a plurality of the facilities.

2. A navigation system as claimed in claim 1, wherein a specific icon is displayed near the telephone number corresponding to a plurality of facilities.

3. A navigation system for a vehicle that receives a telephone number to thereby select a facility, comprising:
   storage means to store a name and coordinates of a facility corresponding to the telephone number,
   display means to display a telephone number that is input by a telephone number input mode,
   and display control means that executes an input processing of the telephone number from the input means, and displays a facility name list of a plurality of facilities if the telephone number is associated with a plurality of facilities, when reading a facility name corresponding to the input telephone number from the storage means and displaying it on the display means.

4. A navigation system as claimed in claim 3, wherein, when a facility is selected from the facility name list, detailed information regarding the selected facility is displayed.

5. A navigation system as claimed in claim 3, wherein, in the telephone number input mode, a telephone number list is displayed on the display means, and a specific icon is displayed near the telephone number associated with a plurality of facilities.

6. A navigation system as claimed in claim 3, wherein the telephone number associated with a plurality of facilities is shared by a plurality of facilities in the same building.

7. A navigation system as claimed in claim 3, wherein the telephone number associated with a plurality of facilities is shared by a plurality of facilities having different addresses.

8. A navigation system as claimed in claim 3, wherein, when setting a desired facility name as a destination from the facility name list of a plurality of facilities, a guide route to the set destination from a present vehicle position is searched, and route guidance is executed.

9. A navigation system as claimed in claim 3, wherein the input means have a cancel key to cancel an input by the ten key.

10. A navigation system as claimed in claim 3, wherein the storage means store the coordinates by longitude and latitude.

11. A destination specifying method for a navigation system that sets a destination by receiving a telephone number, the method comprising:
   configuring a database that associates a telephone number with a name, address, and location f a facility, and when a plurality of facilities share one telephone number, configuring a telephone number database that associates the one telephone number with a plurality of facility names,
   displaying a telephone number list on a display screen, when a destination is set by a telephone number,
   when a specific telephone number is selected from the list, or when a telephone number is directly input, if the telephone number is associated with a plurality of facilities, displaying a facility name list of a plurality of facilities,
   and when a facility is selected from the name list of facilities, displaying detailed information regarding the selected facility.

12. A destination specifying method as claimed in claim 11, wherein, in the telephone number list displayed on the display screen, a specific icon is displayed near a telephone number associated with a plurality of facilities.

13. A destination specifying method as claimed in claim 11, wherein, when a telephone number associated with a plurality of facilities is selected, or when a telephone number is directly input, one of a plurality of the facilities is displayed, and then in accordance with a display request for a facility name list, a facility name list of a plurality of facilities is displayed.

14. A destination specifying method for a navigation system that sets a destination by receiving a telephone number, which makes a database that associates a telephone number with a name, address, and location of a facility, and when a plurality of facilities share one telephone number, retains a telephone number database that associates the one telephone number with a plurality of facility names, the method wherein, when a destination is set by a telephone number, if a leading part of a telephone number of a facility as a destination is input, the navigation system searches the telephone number database and displays recognition information for a telephone number associated with a plurality of facilities, when displaying a list of the telephone numbers having the leading part.

15. A destination specifying method for a navigation system as claimed in claim 14, wherein the recognition information includes a mark pattern, and the mark pattern is displayed near the telephone number.

16. A destination specifying method for a navigation system as claimed in claim 14, wherein the recognition information includes a specific icon, and the icon is displayed near the telephone number.

17. A destination specifying method as claimed in claim 14, wherein, when a telephone number associated with a plurality of facilities is selected, the navigation system displays the name and address of the leading facility corresponding to the selected telephone number.

18. A destination specifying method as claimed in claim 14, wherein, when a telephone number associated with a plurality of facilities is selected, the navigation system displays a facility name list of a plurality of facilities corresponding to the selected telephone number.

19. A destination specifying method as claimed in claim 14, wherein, when a desired facility name is selected from a facility name list of a plurality of facilities, the navigation system displays the address and category of the selected facility name.

20. A destination specifying method as claimed in claim 14, wherein, when a desired facility name is set as a destination from a facility name list of a plurality of facilities, the navigation system searches a guide route to the set destination from the present vehicle position and executes route guidance.

* * * * *